United States Patent
Reiss

(10) Patent No.: US 9,474,216 B1
(45) Date of Patent: Oct. 25, 2016

(54) RAIN SHUT-OFF FOR A MECHANIZED IRRIGATION SYSTEM

(71) Applicant: Ben Reiss, Holdrege, NE (US)

(72) Inventor: Ben Reiss, Holdrege, NE (US)

( * ) Notice: Subject to any disclaimer, the term of this patent is extended or adjusted under 35 U.S.C. 154(b) by 0 days.

(21) Appl. No.: 14/690,885

(22) Filed: Apr. 20, 2015

(51) Int. Cl.
| | |
|---|---|
| *B05B 3/00* | (2006.01) |
| *A01G 25/16* | (2006.01) |
| *A01G 25/02* | (2006.01) |
| *A01G 25/09* | (2006.01) |

(52) U.S. Cl.
CPC ............. *A01G 25/165* (2013.01); *A01G 25/02* (2013.01); *A01G 25/092* (2013.01)

(58) Field of Classification Search
CPC ............. G05D 1/0278; G05D 1/0268; G05D 2201/0201; A01G 25/165; A01G 25/16; A01G 25/092
USPC ........................................ 239/722, 723, 728
See application file for complete search history.

(56) References Cited

U.S. PATENT DOCUMENTS

| | | | | |
|---|---|---|---|---|
| 4,662,563 A * | 5/1987 | Wolfe, Jr. | ............ | A01G 25/092 239/1 |
| 5,413,459 A * | 5/1995 | Woodall | ............. | F04D 29/0413 415/104 |
| 5,927,603 A * | 7/1999 | McNabb | ............. | A01G 25/092 239/63 |
| 7,123,993 B1 * | 10/2006 | Freeman | ................ | A01G 25/16 239/63 |
| 8,720,803 B1 * | 5/2014 | Standley | .................... | B05B 3/18 239/407 |
| 8,876,026 B2 * | 11/2014 | Pfrenger | ............. | A01G 25/165 239/723 |
| 2002/0134868 A1 * | 9/2002 | Hansen | ................ | A01G 25/092 239/728 |
| 2012/0261487 A1 * | 10/2012 | Palmer | .................. | A01G 25/16 239/63 |

* cited by examiner

*Primary Examiner* — Davis Hwu
(74) *Attorney, Agent, or Firm* — Dennis L. Thomte; Thomte Patent Law Office LLC

(57) ABSTRACT

A rain shut-off for a mechanical irrigation system such as a center pivot irrigation system, a corner irrigation system, or a linear irrigation system. The rain shut-off includes a rain gauge which transmits rainfall information to a rain controller. The rain controller will shut down the drive towers of the irrigation system, the water pump engine and the oil dripper system upon a predetermined amount of rainfall occurring within a predetermined period of time.

1 Claim, 4 Drawing Sheets

RAIN SHUT-OFF FOR A MECHANIZED IRRIGATION SYSTEM

BACKGROUND OF THE INVENTION

1. Field of the Invention

This invention relates to a rain shut-off for a mechanized irrigation system such as a center pivot irrigation system, a corner irrigation system, or a linear irrigation system. More particularly, this invention relates to a rain shut-off for a mechanized irrigation system which is rainfall amount adjustable which will shut down the irrigation system when a predetermined rainfall is sensed by an electronic rain gauge over a predetermined period of time.

2. Description of the Related Art

Mechanized irrigation system such as a center pivot irrigation system, a corner irrigation system or a linear irrigation system has long been used to irrigate crops. Most mechanized irrigation systems utilize a control panel which controls the speed of the system, the cycle times of the system, the amount of water applied to different sectors of the area being irrigated, etc. Even though the control panel may be wirelessly monitored from a remote location, to the best of applicant's knowledge, no one has provided a rain shut-off which will discontinue the operation of the mechanized irrigation system should a predetermined amount of rainfall occur at the location of the system over a predetermined length of time. If the irrigation system continues to operate even though rainfall has occurred at the location of the irrigation system, water is wasted and over watering may occur thereby damaging the crop being irrigated.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A rain shut-off is provided for a mechanized irrigation system such as a center pivot irrigation system, a corner irrigation system, or a linear irrigation system. The irrigation system comprises a water supply pipe supported by a plurality of spaced-apart drive towers adapted to move the water supply pipe over a predetermined area with the drive towers being electrically driven. The water supply pipe is fluidly connected to a source of irrigation water. A pump is provided in fluid communication with the source of water for pumping water through the water supply pipe. An engine is connected to the pump for powering the pump.

The mechanized irrigation system includes a control panel for controlling the movement of the drive towers and for controlling the operation of the engine and the pump. A rain controller is electrically connected to the control panel and the engine. A rain gauge is positioned in the vicinity of the mechanized irrigation system with the rain gauge preferably being of the tipping bucket type. The rain gauge is electrically connected to the rain controller so that the amount of rainfall collected by the rain gauge over a period of time is sent to the rain controller. The rain controller is configured to shut down the electric drive motors of the system upon a predetermined amount of rainfall occurring at the location of the irrigation system over a predetermined length of time.

The rain controller is also configured to shut down the engine and pump at the same time the electric drive motors are shut down.

The rain controller is selectively adjustable whereby the shutdown rainfall amounts may be varied.

In the preferred embodiment, the pump includes a lubricating oil drip system which lubricates the pump and wherein the oil drip system is also shut down when the engine is shut down.

In a second embodiment of the invention, a wireless transmitter is associated with the rain gauge which transmits the rainfall information to the rain controller.

It is therefore a principal object of the invention to provide a rain shut-off system for a mechanized irrigation system.

A further object of the invention is to provide a rain shut-off for a mechanized irrigation system which shuts down the irrigation system upon a predetermined amount of rainfall occurring at the location of the irrigation system over a predetermined period of time.

A further object of the invention is to provide a rain shut-off of the type described which may be easily added to existing irrigation systems without substantial modification thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
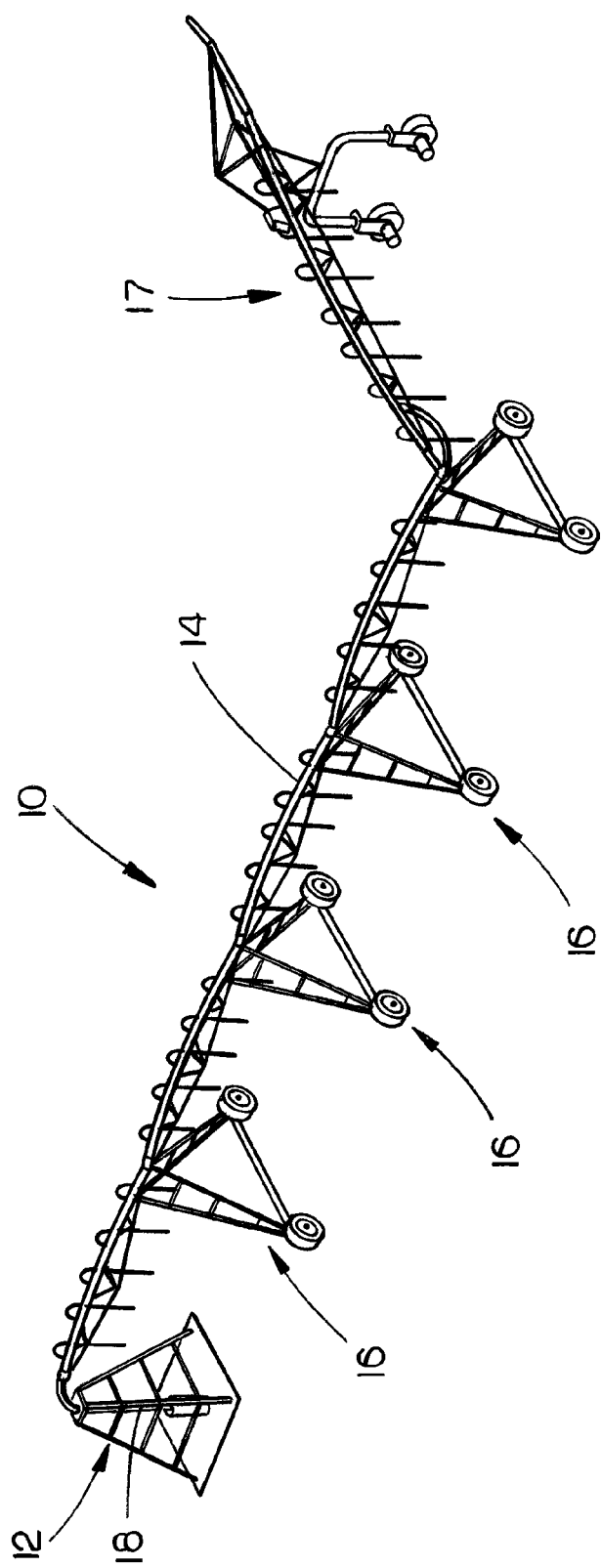
FIG. 1 is a perspective view of a conventional corner irrigation system with which the rain shut-off of this invention may be used.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a mechanized irrigation system which in this case is a corner irrigation system. The irrigation system could be a center pivot irrigation system or a linear irrigation system. System 10 includes a center pivot structure 12 having a main water boom or water supply pipe 14 extending outwardly therefrom. Boom 12 is movably supported upon a plurality of electrically driven drive towers 16 whereby the main water boom 14 may be pivoted or rotated around pivot structure 12 in conventional fashion. System 10 also includes a corner arm structure 17. Pivot structure 12 includes a vertically disposed pipe 18 having one end thereof in fluid communication with the inner end of boom 14. The other end of pipe 18 is connected to pipe 20 which is connected to the discharge side 22 of a turbine pump 24. The intake side 26 of turbine pump 24 is connected to a source of irrigation water such as a well 28 or the like. Turbine pump 24 is driven by an engine 30 which normally includes a 12 volt electrical system. The numeral 32 refers to a conventional oil drip system which supplies lubricating oil to the bearings of the pump. System 32 is controlled by a solenoid valve 34 which is movable between open and closed positions.

The system 10 includes a conventional control panel 36 which controls the cycle of the system, the speed of the system, the amount of water to various portions of the field being irrigated, etc.

Applicant will now describe the components of the rain shut-off system 38 of this invention which will shut off the drive towers 16, the engine 30 and the oil drip system 32.

Figure 3:
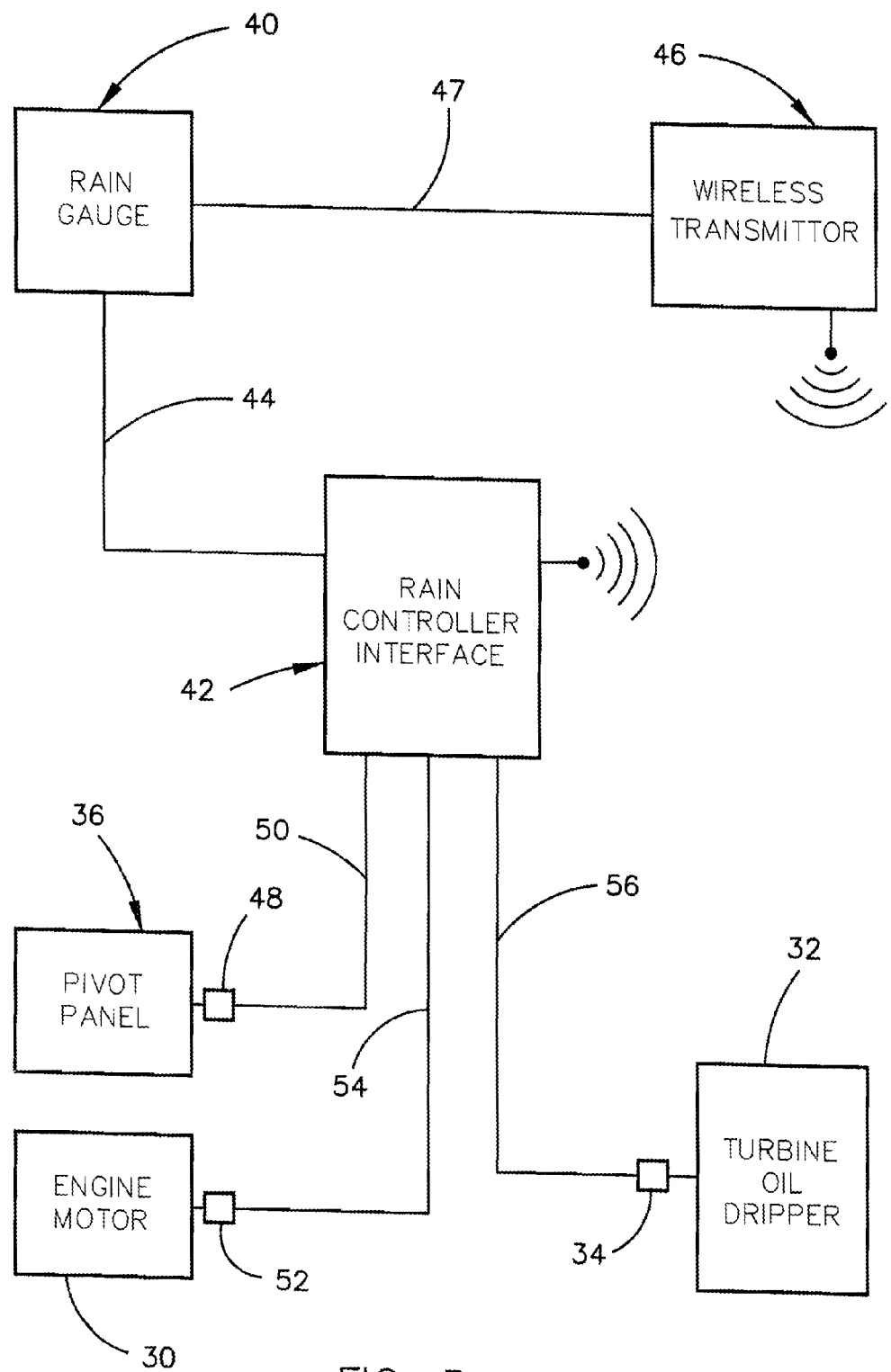
FIG. 3 is a schematic of the rain shut-off of this invention.
Figure 4:
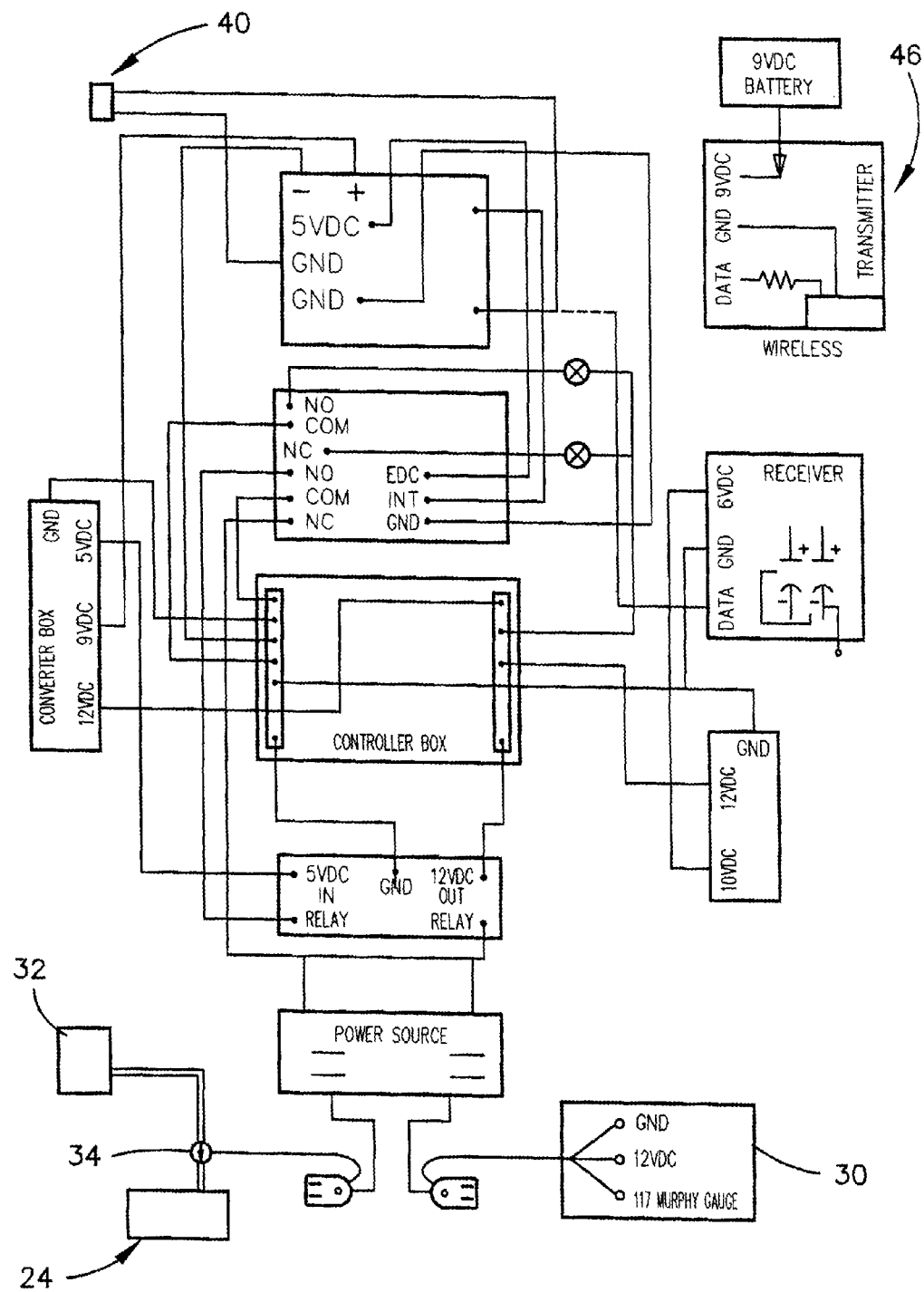
FIG. 4 is a schematic of the circuitry of the rain shut-off of this invention.

Referring to the schematic drawing of FIG. 3, the number 40 refers to a rain gauge which is preferably of the conventional tipping bucket type which collects rainfall and relays information regarding the amount of rainfall received by the gauge 40 to a rain controller interface 42 by way of wire or wires 44. Rain controller interface 42 is positioned in a box 43. If the rain gauge 40 is not hard wired to rain controller 42, it may feed the rainfall amount information to a wireless transmitter 46 by wire or wires 47. If the wireless transmitter 46 is utilized, the rainfall information sensed by rain gauge 40 is wirelessly transmitted to the rain controller interface 42.

Rain controller interface 42 is hard wired to the pump control 48 of control panel 36 by wire or wires 50. Rain controller interface 42 is hard wired to the murphy switch 52 of engine 30 by wire or wires 54. Rain controller interface 42 is hardwired to the solenoid valve 34 of oil dripper system 32 by wire or wires 56.

Figure 2:
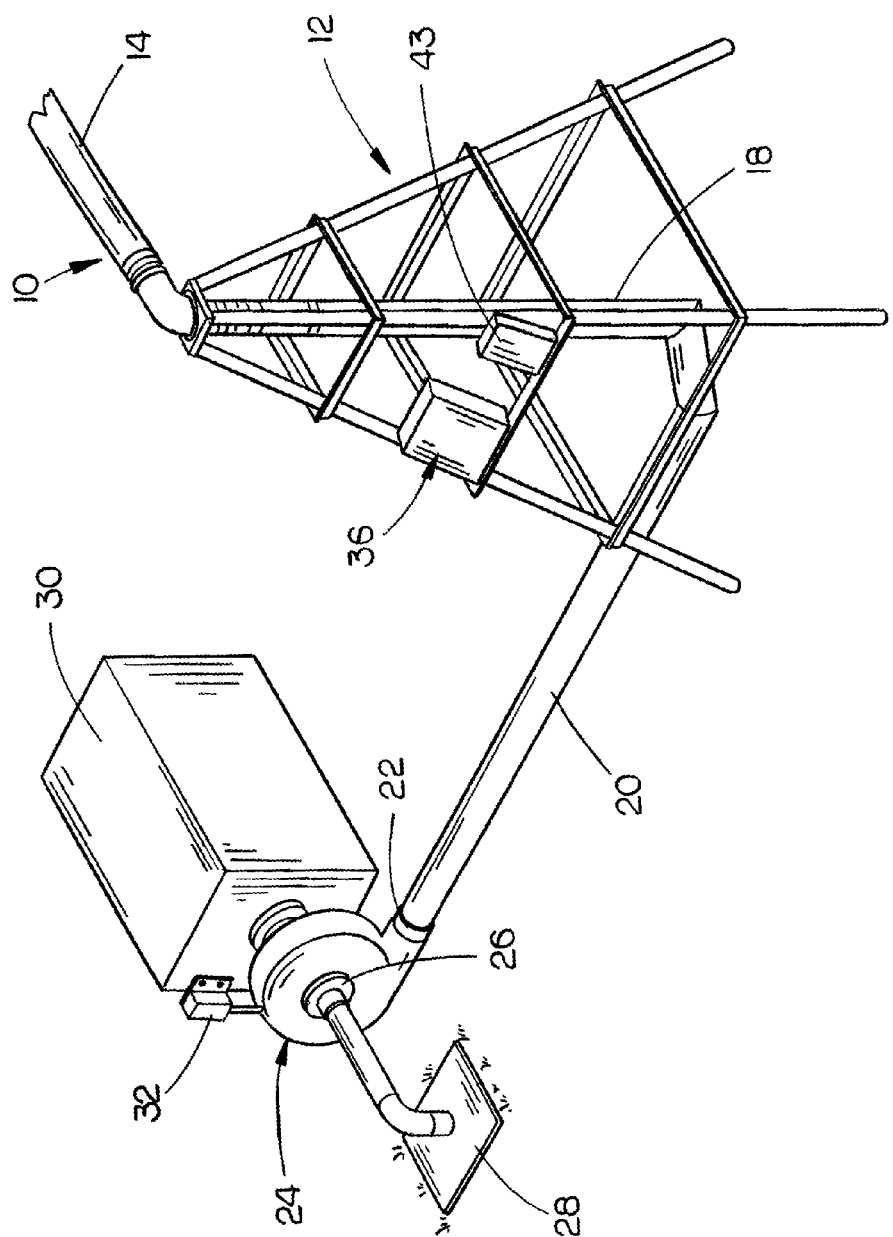
FIG. 2 is a perspective view of a portion of the irrigation system of FIG. 1.

Referring to the schematic drawing of FIG. 2, system 38 functions as follows: assuming that the irrigation system 10 is irrigating an area or a field, the engine 30 will be driving pump 24 so that water is drawn from well 28 and will be delivering water to the main water boom 14. At that same time, the oil dripper solenoid valve 34 will be open so that oil will drip therefrom onto the bearings of the pump 24 in conventional fashion.

If it should rain while the system 10 is operating, the rain gauge 40 will supply the rainfall amount information to rain controller interface 42 either by hard wire or wirelessly. The rain controller interface 42 will process that information. If the rain controller interface has been previously set or adjusted for a certain amount of rainfall in a certain period of time, the irrigation system 10 will continue to function normally. If the rainfall amount set for a predetermined period of time is reached, the rainfall interface 42 will cause the control panel 36 to shut down the drive towers 16. The rain controller interface 42 will also shut down the engine 30, pump 24 and the oil dripper system 32. The shutdown of the system 10 conserves water and prevents over watering.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
   a mechanized irrigation system comprising a water supply pipe supported by a plurality of spaced-apart drive towers adapted to move the water supply pipe over a predetermined area with the drive towers being electrically driven;
   a source of irrigating water;
   a pump in fluid communication with the source of water for pumping water through the water supply pipe;
   said pump having bearings;
   an engine connected to said pump for powering said pump;
   a lubricating oil drip system which supplies lubricating oil to the bearings of said pump when engine is powering said pump;
   said lubricating oil drip system including a solenoid valve which is movable between open and closed positions;
   said solenoid valve, when in said open position, providing lubricating oil to the bearings of the pump;
   said solenoid valve, when in said closed position, preventing the flow of lubricating oil to the bearings of the pump;
   said mechanized irrigation system including a control panel for controlling the movement of the drive towers and for controlling the operation of said engine, said pump, and said solenoid of said lubricating oil drip system;
   a rain controller electrically connected to said control panel, said engine, said pump and said solenoid of said lubrication oil drip system;
   a rain gauge positioned in the vicinity of said mechanized irrigation system;
   said rain gauge being in communication with said rain controller so that information relating to the amount of rain collected by said rain gauge is sent to said rain controller;
   said rain controller being configured to immediately shut down the electric drive motors upon a predetermined amount of rainfall occurring at the location of the irrigation system over a predetermined length of time; and
   said rain controller also being configured to shut down said engine, said pump and to close said solenoid of said lubricating oil drip system at the same time said electric drive motors are shut down.

* * * * *